June 29, 1943. H. E. MALONE 2,322,762
HEAT MOTOR ACTUATED DEVICE
Filed June 21, 1940
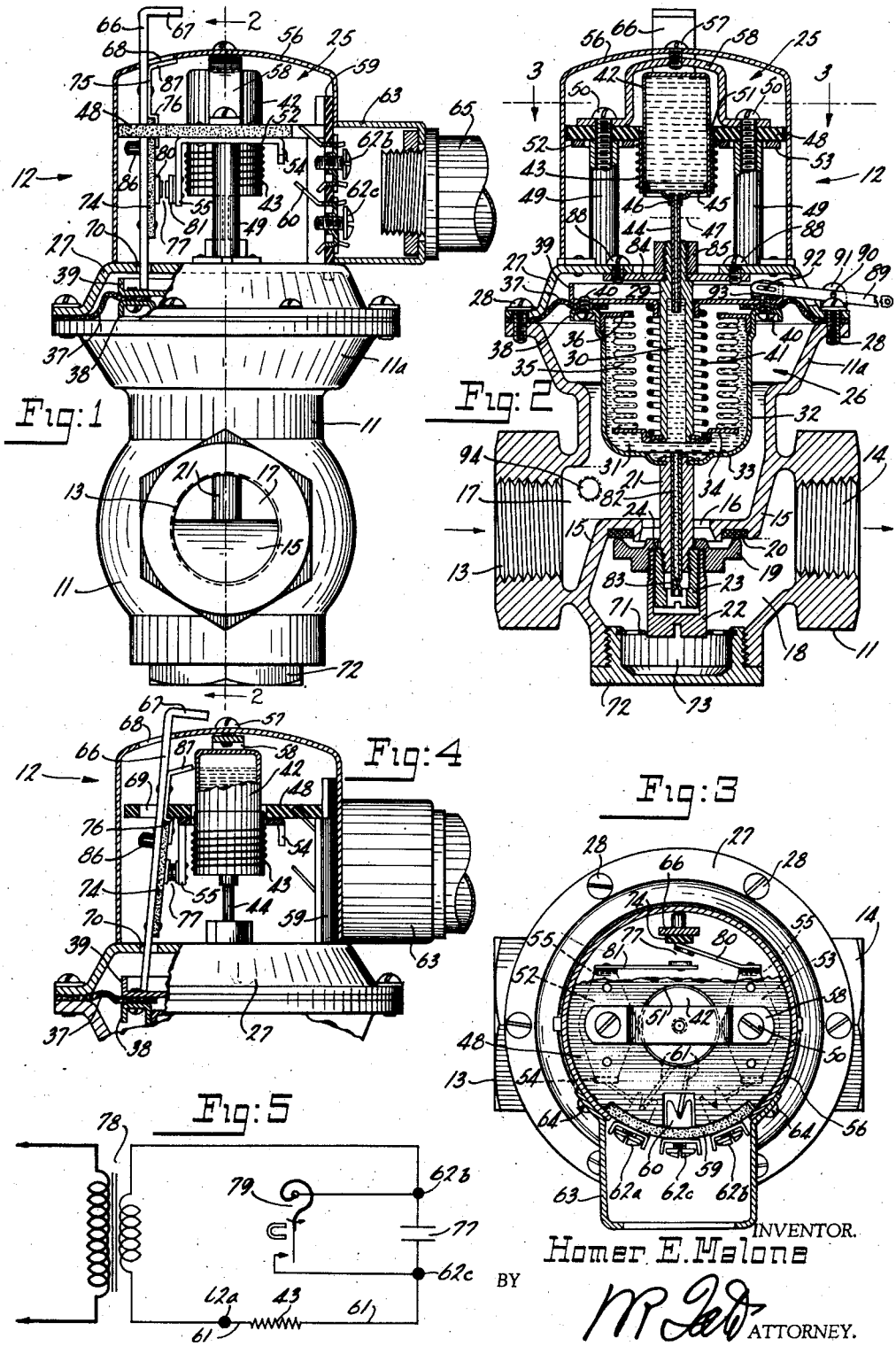
INVENTOR.
Homer E. Malone
BY
ATTORNEY.

Patented June 29, 1943

2,322,762

UNITED STATES PATENT OFFICE 2,322,762

HEAT MOTOR ACTUATED DEVICE

Homer E. Malone, Milwaukee, Wis., assignor to Perfex Corporation, Milwaukee, Wis., a corporation of Wisconsin Application June 21, 1940, Serial No. 341,721

19 Claims. (Cl. 137—139)

The invention relates generally to flow control devices for controlling the flow of gas, or other fluids, and more particularly it relates to such devices wherein a heat motor is employed to shift a flow controller from one position to another.

The primary object of the present invention is to produce a new and improved valve device of the above character wherein the various elements of the valve and of the heat motor are so formed and related that the manufacturing operations are simplified, and reliable operation of the device is attained.

A further object is to provide a heat motor construction for operating valves and the like which provide new and improved operating characteristics.

A further object is to provide a heat motor operated valve wherein the pressure responsive elements of the valve operator is housed in a novel and convenient relationship within the valve casing and wherein the assembly operations involved in mounting the heat motor on the valve casing are relatively simple.

A further object is to provide a heat motor operated valve wherein the various elements are first assembled in a group of sub-assembly units for subsequent completion of the assembly operations.

A further object is to provide a heat motor operated valve embodying a manual actuator for opening the valve when electric power is not available, the manual operator being arranged to cooperate in a novel manner with a recycling switch through the operation of which the manual operator is released upon the return of power.

In devices of this character the expansible and contractible chamber preferably comprises an outer wall formed by a cup-shaped non-expansible member and an inner wall formed by an extensible bellows of generally cylindrical form. At one of its ends the bellows is usually anchored and sealed with respect to the open end of the cup-shaped member, while the other end of the bellows projects into the cup-shaped member and is sealed by a cross plate or disc. Thus the expansible chamber comprises the annular space between the bellows and the cup-shaped member. The pressure fluid is customarily introduced into the chamber through the cup-like outer wall which is stationarily mounted, and the movement of the inner wall or bellows is transmitted to the valve member by a central stem attached to the plate or disc which closes the inner end of the bellows.

It is a further object of the present invention to provide a heat motor mechanism wherein the stem which is connected to the closed end of the bellows serves as the passage for transmitting the pressure fluid from the generator or boiler to the expansible and contractible chamber, thereby simplifying the construction and assembly of the valve device as a whole.

Another object is to provide a valve device wherein the movable parts of the valve and the fluid pressure actuator are guided by means which are of a simple character and are incorporated in the device so as to serve other functions, thereby to promote economical manufacture of the device.

Another object is to provide a valve device which is so constructed and arranged that a damper arm may be readily incorporated therein for operation of a damper in timed relation to the opening and closing movement of the valve.

Another object is to provide a heat motor operated valve device of the above character wherein the collapsible bellows of the fluid pressure responsive actuator is so disposed and arranged that it is protected from the deteriorating action of a controlled fluid such as fuel gas.

A further object is to provide a device of the character wherein the heat motor unit is so constructed and arranged that the operation of filling the unit with volatile fluid may be readily and easily performed; and a more specific object is to privide such a unit wherein the liquid system may be readily and easily filled in the original manufacture, or may be opened and re-filled for purposes of repair, without danger of disrupting the various joints and connections formed in the liquid-enclosing structure.

Other objects and advantages reside in certain features of construction, arrangement and operation of the various parts which will hereinafter be more fully described in the specification and particularly pointed out in the appended claims, and of which a preferred embodiment is illustrated in the accompanying drawing.

In the drawing:

Fig. 1 is an end elevational view partly in section of a heat motor operated valve device embodying the features of the invention;

Fig. 2 is a view taken along the line 2—2 of Fig. 1 showing most of the parts in cross section so as to disclose the internal construction;

Fig. 3 is a sectional top view taken along the line 3—3 of Fig. 2;

Fig. 4 is a view similar to Fig. 1 of the upper portion of the device showing the valve manually opened; while Fig. 5 is a wiring diagram illustrating a circuit arrangement in which the present valve device may be employed.

For the purpose of disclosure, the invention is herein illustrated as embodied in a valve device having a valve body or casing 11 at its lower end and which carries a heat motor 12 upon its upper end. The valve casing 11 has an inlet 13 and an outlet 14, and between the inlet and outlet an interior division wall or partition 15 extends. The division wall 15 has a valve opening or port 16 formed therein, the lower edge of which constitutes a valve seat. The division wall 15 divides the valve casing into an inlet chamber 17 and an outlet chamber 18. Within the outlet chamber 18 a valve member 19 is positioned, this valve member 19 being carried by the lower end of an axial valve stem 21 whereby it may be moved upwardly into engagement with the valve seat 20 to close the valve port 16, or may be moved downwardly away from the valve seat 20 so as to open the valve port and permit the passage of fluid from the inlet 13 to the outlet 14.

The valve seat 20 is preferably constructed of a rubber composition and is recessed into the division wall 15 as shown. The valve member 19 is loosely supported from the end of the stem 21 in a manner to provide a limited amount of play when the valve member is seated so that any unevenness of the valve member 19 or axial misalignment of stem 21 is readily compensated for. The elements for providing the lost motion of the valve member 19 include a hollow stud 22 threaded into the valve member 19 and a second hollow stud 23 arranged inside the hollow stud 22 and threaded upon the end of valve stem 21. The valve member 19 rests against a shoulder edge 24 on the upper end of stud 23, and a certain amount of play is thereby permitted around this shoulder due to the spacing between the adjacent walls of studs 22 and 23 and between the valve stem 21 and valve member 19 as shown. With this type of swivel construction it will be clear that a fluid-tight seal is provided, preventing the escape of fluid from chamber 17 to 18, since the stud 23 threads into valve member 19 and stud 23 into valve stem 21.

The valve stem 21 extends upwardly into the inlet chamber 17 where it is operatively associated with the heat motor 12. The heat motor 12 is carried by and partially housed within an upwardly extending bell-shaped housing 11a formed as an integral part of the upper portion of valve casing 11.

The heat motor 12 comprises a stationary power unit indicated at 25 wherein fluid pressure is developed, by the heating of a volatile liquid, for a movable actuating unit indicated at 26 wherein the fluid pressure thus developed is applied through pressure responsive means to the valve stem 21 so as to operate the valve.

The stationary unit 25 of the heat motor 11 is carried on a dish-shaped mounting plate 27 which spans the open upper end of the bell housing 11a and is secured thereto by means such as screws 28. This plate 27 is preferably dished upwardly so as to have side wall portions above the level of the bell housing 11a and thereby provide working space above the level at which the plate 27 is clamped onto the bell housing 11a.

In associating the stationary power unit 25 with the movable actuating unit 26, a stationary tube 29 has its upper end fixed to and projecting through the mounting plate 27, and the tube 29 extends downwardly in coaxial relation to the bell housing 11a and the valve stem 21 to a point somewhat above the upper end of the valve stem 21. The fluid pressure developed by the power unit 25 is transmitted through a central bore 30 of the tube 29 to an expansible and contractible chamber 31, the movable element of which is operably associated with the valve stem 21. In its preferred form the valve chamber 31 is formed by a relatively rigid cup-shaped member 32, the bottom wall 33 of which is secured co-axially to the upper end of the valve stem 21 as by riveting and soldering. The cup-shaped member 32 forms the outer wall of the chamber 31, and the inner wall of the chamber 31 is formed by a disc 34 secured to the lower end of stationary tube 29 and a collapsible bellows 35, made from a flexible material such as bronze, extending between the outer edge of the disc 34 and the upper end of the cup-shaped member 32. The connection of the bellows 35 at its upper and lower ends is fluid-tight so that the chamber 31 comprises the space between the bellows 35 and the side walls of the cup-shaped member 32. As herein shown the upper end of the bellows 35 is crimped about the inwardly extending flange of an annular ring 36, and as the bellows 35 is put in place in the cup-shaped member 32, this ring 36 is forced into the top of the member 32. The joints between the ring 36 and the bellows 35 and between the ring 36 and the cup-shaped member 32 are then soldered to attain the desired seal. With this arrangement when the pressure fluid is forced through the tube 30 into the chamber 31, the cup-shaped member 32 is forced downwardly and the bellows 35 is collapsed or contracted, thereby moving the valve member 19 downwardly away from the valve seat 20.

In the embodiment of the invention the mounting plate 27 has one or more apertures therein for purposes to be hereinafter discussed, and since the inlet chamber 17 extends about the cup-shaped member 32 within the bell housing 11a, sealing means is provided in such a manner between the bell housing and the cup-shaped member 32 so as to allow shifting movement of the cup-shaped member 32 and yet prevent the escape of fluid about the upper end of the member 32. This sealing means also serves to protect the bronze metal of the bellows 35 from the deteriorating action of the fluid which is flowing through the valve casing 11. This undesirable action upon the diaphragm would be quite pronounced if commercial fuel gas were allowed to come in contact with the bellows. Where the use of the valve is such that the plate 27 may be made imperforate, and the controlled fluid is of such a character that it will not deteriorate the bellows, this sealing means may, of course, be eliminated. In the present instance this sealing means takes the form of a flexible diaphragm 37 made from a material such as leather which is impervious to the passage of the controlled fluid. The outer edge of the diaphragm 37 is clamped between the opposed peripheral edges of the mounting plate 27 and the bell housing 11a, while the inner peripheral edge of the diaphragm 37 is clamped between an outwardly extending flange 38 at the upper end of the cup-shaped member 32 and an overlying clamp 39. The clamp plate 39 has a central opening therein which slidably surrounds the tube 29 and is clamped against the top of the flange 38 by a plurality of screws 40. An expansible coil spring 41 surrounds the tube 29 within the bellows 35, and acts at its opposite ends against the disc 34 and the clamp plate 39. Since the disc 34 is stationary, the spring 41 acts upon the clamp plate 39 and through the cup-shaped member 32 to urge the valve member 19 upwardly to its closed position. Thus the bellows 35 and the cup-shaped member 32 form a fluid pressure operated device wherein the cup-shaped member is shifted longitudinally of the stem 29 in response to variations in fluid pressure in the chamber 31. In such movement the central aperture of the plate 39 rides along the stem or tube 29 so as to impart a lateral guiding action to the upper end of the cup-shaped member 32.

The power unit 25, which functions to generate the fluid pressure for operating the actuating means 26, preferably comprises a generator or boiler 42 heated by means such as an electric heater 43 so that a volatile liquid, preferably acetone, contained within the boiler 42 may be vaporized by the electric heater 43 to build up fluid pressure in the boiler. This fluid pressure within the boiler forces the remainder or unvaporized portion of the fluid from the boiler 42, through a connecting tube 44, into the tube 30 and the fluid pressure responsive chamber 31. The boiler 42, as herein shown, comprises an inverted cup-like shell made from an extremely thin material and having its lower end closed by a bottom plate 45 which is soldered in place in the lower end of the shell. The bottom plate 45 of the boiler has an axial nipple 46 drawn therefrom in downward direction, and the upper end of the connecting tube 44 extends into this nipple 46 and is silver soldered in place. The tube 44 is of relatively small cross section, and its lower end fits into the upper end bore of the tube 29 and is soldered therein.

The electric heater 43 is formed by a plurality of turns of high resistance wire wound about the boiler 42 with a layer of insulating material such as mica interposed between the boiler and insulating wire. In accordance with the present invention the boiler 42 is constructed so as to have an extremely small mass, and the heater 43 is located about the lower portion of the outer cylindrical surface of the boiler 42, since it has been found that through the use of this construction, the operating characteristics of the valve are materially improved. This improvement in the operating characteristics of this valve is concerned principally with the rate of movement of the valve member during the initial portion of its opening movement and during the terminal portion of its closing movement; but in addition, this construction results in a material reduction in the time which elapses between the de-energization of the heater 43 and the complete closure of the valve port 16.

In operation, with the heater 43 located about the lower portion only of the boiler as stated, the greater portion of the body of fluid in the boiler 42 is heated substantially to the critical or vaporizing temperature before vaporization starts. Hence after the vaporization begins, it progresses rapidly so as to produce rapid movement of the valve member from its fully closed position toward its open position. This rapid movement continues throughout substantially the entire opening movement of the valve.

When the valve member 19 reaches its fully open position, the liquid is driven entirely out of the boiler 42 to an approximate point as indicated at 47 in the tube 44, so that the boiler is filled entirely with vapor. During the continued heating of the boiler, this condition is substantially maintained, and the heat produced by the heater 43 is, by reason of the location of the heater, efficiently applied or concentrated near the surface of the expelled liquid so as to maintain this condition without requiring undue heat output or undue heater capacity. It will be evident, of course, that the upper portion of the thin-walled boiler 42 will at all times remain at a slightly lower temperature than the lower portion of the boiler, since this upper portion is remote from the heater 43 and is exposed for radiation of heat to the surrounding air.

When the heater 43 is de-energized, the entire boiler and heater structure will start to cool, and while the initial portion of the valve closing movement may be relatively slow while the heat in the heater is being dissipated, it will be evident that the upper portion of the boiler 42 has such low heat inertia that after the relatively cool liquid has started its return flow into the boiler, the heat remaining in the walls will be rapidly dissipated so that the last or terminal portion of the closing movement of the valve member 19 invariably takes place at a rapid rate. By so proportioning the heater 43 that the heat applied thereby to the lower portion of the boiler is only slightly more than is required to maintain the valve in its open position, and by use of a boiler of small mass with a large area of its upper portion exposed as a radiating surface, it has been found that the total time required between de-energization of the heater 43 and the complete closure of the valve is materially reduced, and the operating characteristics of the valve are materially improved.

The heat motor 12 is provided with a supporting plate 48 formed of insulating material, and supported parallel to the top of the mounting plate 27 and spaced upwardly a substantial distance therefrom. The plate 48 is held in position by a pair of spacing sleeves 49 arranged between the plate 48 and the plate 27 and screws 50 extending through the plate 48 and the sleeves 49 and threaded into the plate 27. The plate 48 has a central opening 51 therein which surrounds the boiler 42 above the heater 43 and acts to impart lateral support to the boiler. In the present instance the plate 48 is located substantially midway between the upper and lower ends of the boiler 42. On its lower surface the plate 48 has a pair of U-shaped bracket members 52 and 53 mounted in fixed relation and each bracket has one arm 54 projecting downwardly adjacent one side of the plate 48 and another arm 55 projecting downwardly adjacent the other side of the plate 48 for a purpose which will be pointed out hereinafter. An enclosing cover 56 is provided for the power unit 25 which is of an inverted cup-shaped form having its other end resting upon the plate 27. The cover 56 is held in place by a screw 57 extending axially through the top of the cover 56 and threaded into a U-shaped bracket 58, the bracket 58 being carried on the top of the plate 48 and extending upwardly over the upper end of the boiler 42 so as to protect the boiler 42 from damage.

In order to provide for the electrical wire connections of the device, a terminal plate 59 of insulating material is arranged on top of the plate 27 and is held in place against a recessed portion of the supporting plate 48 by the cover 56 as seen in Fig. 3. A number of wire terminal clips 60 for attachment of the internal wires 61, together with the associated screws 62a, 62b and 62c for attachment of the external incoming wires (not shown), are secured to opposite sides of the terminal plate 59. The terminal clips 60 serve for the attachment of the small leads 61 extending to the electric heater 43 and the bracket arms 54. A conduit bushing 63 is attached to the outside of the cover 56 by screws 64 and serves as a means for the attachment of the conduit 65 carrying the incoming electrical conductors.

Since the present power unit 25 is dependent for its regular operation upon continuance of the electrical power supply, the present valve is preferably provided with a manual operating means whereby the valve may be opened during the absence of electrical power. In the present instance this manual operating means comprises a vertically shiftable plunger 66 which is in the form of a flat metal strip having its upper end bent to a horizontal position to provide a finger piece 67. The plunger 66 extends through a relatively large opening 68 in the top wall of the cover 56 and thence through a guide opening 69 in the plate 48. The plunger 66 then extends through a guiding opening 70 in the mounting plate 27 so that its lower end rests upon the clamping plate 39 adjacent one edge thereof. When it is desired to open the valve by means of the manual operator 66, the finger piece 67 thereof is manually pressed downwardly and the plate 39, the cup-shaped member 32, and the valve carrying stem 21 are thereby forced downwardly against the force of the spring 41 to their valve opening position.

It will be noted that in the application of this manual valve opening force, the upper end of the pressure responsive device 26 is guided by the sliding engagement of the plate 39 with the stem 29, but there may be a tendency to tip or tilt the plate 39 and the associated parts at the side where the plunger 66 is pressing down. Means is therefore provided to impart a similar guiding action to the lower end of the valve stem 21. In the present instance this means includes the hollow stud 22 located in co-axial relation to the stem 21 beneath the valve 19, and this guiding stud 22 rides loosely in a guide washer member 71 which is carried axially on the inner face of a removable plug 72. The removable plug 72 has a hollow portion 73 and is threaded into the bottom opening of the body 11, which opening is of sufficient size to allow the valve member 19 and associated elements to be inserted and assembled therethrough into the valve body casing 11. The guide washer 71 comprises an apertured stamping which is fastened in the relatively large bore 73 to the periphery of plug 72. The bore 73 is quite large in diameter and the apertures in washer 71 permit any foreign matter to accumulate in the hollow bore 73 and hence the possibility of blocking of the valve is practically negligible.

Returning now to the manual actuator 66, means is provided for latching the actuator 66 in its valve opening position. In the present instance this latching means comprises an insulating plate 74 secured on one side of the plunger 66 together with a metal strip 75 arranged in such a position that its upper end provides a shoulder 76 which may be engaged with the lower face of the plate 48 when the plunger 66 has been depressed to its valve opening position and the spring 41 compressed. Such latching engagement is attained by shifting the upper end of the plunger 66 laterally or to the right after it has been depressed. When the plunger is to be released, it is depressed slightly from its latched relation and by means of a constantly applied yielding force is urged laterally in the other direction or to the left so as to release the shoulder 76 from its latched engagement with the plate 48. In the present instance this yielding force is applied by means of one of the elements of a normally open spring contact switch 77, this switch 77 serving as a recycling means to again place the heat motor 12 under the control of its automatic control means after the return of electrical power.

As shown in the schematic diagram of Fig. 5, the heater 43 is energized by low voltage current from the low voltage secondary winding of a transformer 78 having its primary winding connected to a source of high voltage alternating current. The transformer secondary winding is connected to the screw terminals 62a and 62b. An automatic control device such as a snap acting room thermostat 79 of conventional design is connected to the screw terminals 62b and 62c. The electric heater 43 is connected by the wires 61 to the wire clips 60 on screw terminals 62a and 62c, while the recycle switch contacts 77 are connected through the bracket legs 54 of brackets 52 and 53 to the wire clips 60 of screw terminals 62b and 62c.

When the thermostat 79 closes its contacts in response to a call for heat, a heater circuit is established including the wires and terminals 62b and 62c, the secondary of the transformer 78, the terminal 62a, through the heater 43 and back to the terminal 62c and the thermostat 79. The heater of the heat motor is accordingly energized.

The recycling switch 77 is disposed, in an electrical sense connected in parallel with the thermostat 79 between the two terminals 62b and 62c shown in the wiring diagram. In practice, the recycle switch 77 comprises a pair of spring blades 80 and 81 mounted one on each of two depending arms 55 of the brackets 52 and 53. The blade 80 is so biased that it tends to move away from the blade 81 and to bear constantly against the insulating strip 74, as seen in in Fig. 3. When the manual valve operating plunger 66 is pressed downwardly to open the valve and is moved to the right so as to latch the valve in its open position to the position shown in Fig. 4, this lateral movement of the plunger 66 and its insulating strip 74 serves to close the switch contacts 77. During such closure the bias of the spring blade 80 tends to move the plunger 66 to the left or to its unlatched position, but the upward pressure of the spring 41 is such that the spring blade 80 is ineffective to release the plunger 66 so long as the tension of the spring 41 maintains the plate 39 in engagement with the lower end of the plunger 66. The position to which the valve member 19 is actuated by the manual operator or plunger 66 is somewhat less than the fully opened position of the valve member 19. Hence by operation of the heat motor 25, when the valve is latched manually open the valve may be given an additional opening movement, to thereby shift the plate 39 downwardly away from the end of the plunger 66. When such operation takes place the force of the spring blade 80 is sufficient to shift the plunger 66 laterally to the left to its released or unlatched position of Fig. 1. When the valve is manually operated to its partially open position, a suction is produced in the boiler so that a vacuum space is created in the boiler top as seen in Fig. 4.

From the above it will be apparent that when the valve has been opened and latched in its open position by means of the plunger 66, the switch 77 is closed, and when power returns to the circuit the heater 43 is energized and the valve is actuated toward its extreme open position to thereby unlatch the manual actuator. This unlatching of the actuator 66 results in the opening of the switch 77, and if the thermostat 79 happens at this time to be open, the heater 43 is de-energized and the valve returns to its closed position. If, on the other hand, the thermostat 79 is closed at this time, the heater 43 remains energized and the valve is maintained open until such time as the thermostat 79 acts in its normal manner to break the heater circuit.

In the manufacture of the present device the assembly of the parts is relatively simple. In such assembly the valve stem 21 is first connected to the cup-shaped member 32. A filling and sealing tube 82 is then inserted into the bore of the valve stem 21 and is sealed therein by means of a soldered joint indicated at 83, this soldered joint being formed at the lower end of the valve stem 21 so that in the event that the volatile liquid requires replenishing, the refilling or replenishing operation will be simplified. The tube 29 next has the disc 34 secured thereto by a suitable riveting and soldering operation, and the lower end of the bellows 35 is interlocked and suitably sealed onto the outer edge of the disc 34, while the upper end of the bellows 35 is crimped to the ring 36. The tube 29, with the plate 34 and the bellows 35, is then inserted into the cup-shaped member 32 and the upper end of the bellows is sealed by soldering of the ring 36 at its joints with the bellows and the upper portion of the cup-shaped member 32. The spring 41 is then placed within the bellows, the plate 34 preferably being depressed about the tube 29 so as to accurately position the lower end of the spring 41. The plate 39 is then placed in position over the cup-shaped member 32, and the central opening of the plate 39 preferably has a downwardly extending lip which extends into and accurately positions the upper end of the spring 41. A relatively small connecting plate 84 is then positioned over the reduced threaded upper end of the tube 29, and is clamped in place on the tube 29 by a nut 85 which is threaded onto the reduced upper end of the tube 29. The tube 44 is then inserted into the tube 29 and is soldered therein, it being understood that the boiler 42 has previously been mounted on the tube 44. The boiler 42 and the chamber 31 may then be filled with the volatile liquid. This volatile liquid may be any one of a number of commercially available liquids, and preferably one such as acetone. This liquid is forced into the chamber 31 and the boiler 42 through the tube 82 which at this time has its lower end open and projecting a considerable distance from the lower end of the valve stem 21. After the filling operation the tube 82 is pinched closed at 83 closely adjacent to the lower end of the valve stem 21, and is soldered closed. It will be noted that the filling tube 82 is remotely located with reference to the boiler 42, so that the filling operations, in either the original manufacture or in subsequent repair, may be performed without danger of disrupting the other joints or parts of the fluid system. This relationship is of particular importance in that it enables the boiler 42 to be made of extremely thin materials and thereby makes it possible to produce a boiler of extremely low mass.

The heater 43 may be wound upon the boiler 42 either before or after the mounting of the boiler on the tube 29. The mounting of the diaphragm 37 between the flange 38 and the plate 39 may also be accomplished at various times in the assembly operation, but since the diaphragm is preferably formed of a flexible leather, I prefer to delay the mounting of the diaphragm until all of the required soldering operations have been accomplished. Since the leather is thin and relatively stretchable, it may be worked over the flange 38 and into the clamping space after the above described assembly operations have been accomplished.

The various elements which are associated with the insulating plate 48 are connected in a sub-assembly operation. The plunger 66 is inserted through the guide opening 69 and a stop pin 86 riveted on the plunger 66 beneath the plate 48 limits upward movement of the plunger. Above the plate 48 the plunger 66 has an angle bracket 87 secured thereto, and formed out of the strip 75. In the sub-assembly the pin 86 and the angle bracket 87 act to retain the plunger 66 on the plate 48. The two brackets 52 and 53 and the top bracket 58 are also secured to the plate 48 in the sub-assembly operation. This sub-assembly is then positioned on the mounting plate 27 and is secured in spaced relation thereto by the spacing sleeves 49 and the screws 50.

The sub-assembly which is thus formed, and which includes the plate 27 and the plate 48, is then placed in position over the boiler 42 with the boiler passing through the opening in the plate 27 and so that the relatively small securing plate 84 is located beneath and in engagement with the lower surface of the plate 27. The plate 84 is then securely connected to the plate 27 by means of a plurality of screws 88.

In the mounting of the heat motor 12 on the valve casing 11, the outer edge of the diaphragm 37 is clamped between plate 27 and the upper end of the bell housing 11a. After the heat motor is in place the valve member 19 is secured in position on the valve stem 21 by means of the guide bushings 22 and 23, and the plug 72 is then threaded in position in the bottom opening of the valve casing. The terminal plate 59 is next placed upon the plate 27 with its lower edge resting in notches in the plate 27 and its upper end placed in the recess of plate 48. The cover 56 is then placed over the assembly so that it holds the plate 59 in place, after which the conduit bracket 63 is attached to the cover by the screws 64, as seen in Fig. 3. The cover is held in place by the screw 57 threaded into bracket 58. The internal electrical connections 61 between the heater 43 and the clips 60 and between the bracket legs 54 and the clips 60, as seen in Fig. 3, are made before the cover 56 is placed in position. The cover 56 is arranged in position on the heat motor assembly so as to protect and house the various elements of the boiler, the heater, and the recycling means, and it will be noted that the angle bracket 87 serves to partially close the opening 69 when the plunger 66 is in its elevated position, thereby preventing the entrance of dust through the opening 69. The plunger is normally retained in this elevated position due to the frictional action induced by the spring action of the contact blade 80. When the guide bushing 22 has been put in place, it serves the additional function of surrounding and protecting the end 83 of the filling tube 82.

In certain types of installation, it is desirable to operate a furnace damper or other control means in coordinated relation to the opening and closing of the valve, and for this purpose the present valve device is provided with a lever arm 89 pivoted on a horizontal pivot intermediate its ends at 90 on a bracket 91. The bracket 91 is located on the upper face of the mounting plate 27 adjacent the edge thereof and is held in place by certain of the screws 78. The right hand arm of the lever 89 projects away from the valve device for connection with the control device or damper which is to be operated, while the other left hand end extends through an opening or slot in the upwardly sloping portion of the plate 27. This end extends over a notched edge of the plate, and is connected by a pin and slot joint 92 to a bracket 93 which is fixed on the upper face of the plate 39 by one of the screws 40. The lever 89 is thus rocked about its pivot 90 in coordinated relation to the valve movements.

In certain installations it may be necessary to provide for a continuously lighted pilot, and a plugged orifice 94 in the inlet chamber 17 is provided for the purpose of connecting the pilot light pipe thereto.

From the foregoing description it will be evident that the present invention provides a new and improved heat motor operated valve device which is compact in structure and efficient in operation; that it embodies improved operating characteristics which are obtained through structure of a simple and effective character; and that the present valve is adapted for economical and efficient manufacture and repair.

While certain preferred embodiments of the invention have been specifically disclosed, it is understood that the invention is not limited thereto, and many variations will be readily apparent to those skilled in the art, and the invention is to be given its broadest possible interpretation within the term of the following claims.

What is claimed is:

1. A heat-motor operated valve of the character described comprising, in combination, a valve casing having inlet and outlet openings and an internal division wall between said openings defining inlet and outlet chambers and having a valve port in said division wall providing for communication between said chambers, a valve member for closing said port, said valve casing having a mounting bell portion extending therefrom and forming a continuation of one of said chambers aligned with said valve opening, a heat motor unit mounted on said bell portion and operatively connected to said valve member, said heat motor unit comprising means including a mounting member spanning the end of said bell portion, a fluid pressure operated expansible and contractible unit carried by said mounting member and housed within said bell portion, and an electrically heated fluid pressure generator unit mounted on said mounting member exteriorly of said mounting bell portion, said fluid pressure operated unit comprising a stationary central tubular stem having one end fixed to said mounting member and communicating with said pressure generator, said stem extending from said mounting member axially into said mounting bell and toward said valve port, an expansible and contractible bellows surrounding said stem and having one end secured to the other end of said stem in fluid-tight relation, the secured end of the bellows being between the other end of said bellows and the valve port, a relatively rigid cup-shaped member enclosing said bellows and having its transverse wall positioned facing said valve port, the other end of said bellows being joined to the side wall of said cup-shaped member in fluid-tight relation, said tubular stem communicating with the chamber formed between said cup-shaped member and said bellows, means operatively connecting said cup-shaped member to said valve member, and sealing means for preventing contact of the fluid in said bell portion with said bellows.

2. A heat-motor operated valve of the character described comprising, in combination, a valve casing having inlet and outlet openings and an internal division wall between said openings defining inlet and outlet chambers and having a valve port in said division wall providing for communication between said chambers, a valve member for closing said port, said valve casing having a mounting bell portion extending therefrom and forming a continuation of one of said chambers aligned with said valve opening, a heat motor unit mounted on said bell portion and operatively connected to said valve member, said heat motor unit comprising a mounting member spanning said bell portion, a fluid pressure operated expansible and contractible unit carried by said mounting member and housed within said bell portion, and an electrically heated fluid pressure generator unit mounted on said mounting member exteriorly of said mounting bell portion, said fluid pressure operated unit comprising a stationary central tubular stem having one end fixed to said mounting member and communicating with said pressure generator, said stem extending from said mounting member axially into said mounting bell and toward said valve port, an expansible and contractible bellows surrounding said stem and having one end secured to the other end of said stem in fluid-tight relation, the secured end of the bellows being between the other end of said bellows and the valve port, a relatively rigid cup-shaped member axially aligned with said valve port, said cup-shaped member enclosing said bellows and having its transverse wall positioned facing said valve port, the other end of said bellows being joined to the side wall of said cup-shaped member in fluid-tight relation, means providing a fluid-tight seal between said cup-shaped member and said bell portion whereby to permit movement of said cup-shaped member toward and away from said valve port while preventing the passage of fluid from said bell portion, said tubular stem communicating with the chamber formed between said cup-shaped member and said bellows, and means operatively connecting said cup-shaped member to said valve member.

3. A heat-motor operated valve of the character described comprising, in combination, a valve casing having inlet and outlet openings and an internal division wall located between said openings defining inlet and outlet chambers and having a valve port in said division wall providing for communication between said chambers, a valve member for closing said port, said valve casing having a mounting bell portion extending therefrom and forming a continuation of one of said chambers aligned with said valve opening, a heat motor unit mounted on said bell portion for operating said valve member, said heat motor unit comprising a fluid pressure operated device and a fluid pressure generator therefor, said fluid pressure operated device comprising a cup-shaped outer member, and expansible and contractible bellows having one closed end and positioned within said cup-shaped member with its closed end adjacent to the closed end of said cup-shaped member, the open ends of said bellows and said member being sealed together to form a chamber therebetween, a hollow stem extending into said bellows and connected at one of its ends to the closed end thereof so that the bore of the stem communicates with said chamber, a connector plate secured to said stem adjacent to its other end, said generator being mounted on said other end of said stem with said generator in communication with the bore of said stem, a mounting plate having a central opening through which said generator is projected after assembly of the generator and the fluid pressure operated device, means securing said connector plate to said mounting plate across the open end of the bell portion, and means operatively connecting said cup-shaped member to said valve member.

4. A heat-motor operated valve of the character described comprising, in combination, a valve casing having inlet and oulet openings and an interior division wall located between said openings and having a valve port therein, a valve member for closing said port, a heat motor unit mounted on said casing for operating said valve member, said unit including a fluid pressure generator, electric heating means therefor, and a pressure responsive expansible and contractible device operatively associated with said generator to expand and contract in response to pressure variations produced in said generator, said device comprising an inner generally cylindrical wall formed at least in part by an expansible and contractible bellows and an outer cylindrical wall surrounding said inner wall and secured in sealed fluid-tight relation at one of its ends to the corresponding end of said bellows, a cross wall closing the other end of said outer wall, means operatively connecting said cross wall to said valve member, and means supporting said expansible and contractible device comprising a hollow stationary member communicating at one end with said generator and connected at its other end to the other end of said bellows to discharge pressure fluid into the space between said outer wall and said bellows.

5. A heat-motor operated mechanism of the character described, comprising a casing, a control member, a heat motor unit mounted on said casing and operating said control member and including a fluid pressure operated expansible and contractible device operatively associated with said control member and a fluid pressure generator to actuate said device, supporting wall means associated with said casing and upon opposite sides of which said generator, and said fluid pressure operated device are supported, electric heater means associated with said generator, switching means for controlling said electric heater means, manual means for positioning said control member independently of said heat motor and for operating said switching means for energizing said heat motor, and means operated by said heat motor for operating said switching means.

6. A heat-motor operated valve of the character described, comprising a valve casing having inlet and outlet openings and an interior division wall located between said openings and having a valve port therein, a valve member for closing said port, a heat motor unit mounted on said casing and operating said valve member and including a fluid pressure operated expansible and contractible device operatively associated with said valve member and a fluid pressure generator to actuate said device, a supporting wall associated with said casing and upon opposite sides of which said generator and said fluid pressure operated device are supported, electric heater means associated with said generator, an insulating plate carried by said supporting wall in spaced relation thereto and operatively engaging said generator to impart lateral support thereto at a point spaced from said supporting plate, a manual operating member slidably mounted in and projecting through said insulating plate and said supporting wall and engageable with said pressure fluid operated device to shift said valve member to an open position independently of the operation of said generator, a normally open recycling switch carried by said insulating plate and adapted when closed to energize the heater means, means for latching said operating member in a valve opening position, and means on said operating member operable when said member is thus latched to close said recycling switch.

7. A heat-motor operated valve of the character described comprising, in combination, a valve casing having inlet and outlet openings and an interior division wall between said openings and having a valve port therein, a valve member for closing said port, a heat motor unit mounted on said casing for operating said valve member, said heat motor unit including an expansible and contractible chamber operatively associated with said valve member to shift said member between open and closed positions, and a fluid pressure generator communicating with said chamber, an electric heating means for heating said generator, a manual actuator for shifting said valve member to an open position when electric power is not available for energizing said heater, latch means for said actuator, said actuator being shiftable manually from a normal released position to a latched operative position wherein said valve is partially opened, a normally open switch for connecting said heating means to the source of electric power, said actuator being operable to close said switch when said actuator is in its latched position, said switch including a spring contact arm operable when said switch is closed to apply a yielding force tending to unlatch said actuator, and a spring urging said valve member toward closed relation and operable upon said manual actuator while said generator remains unheated to prevent unlatching of said manual actuator by said spring contact arm.

8. A heat-motor operated device of the character described comprising, in combination, a casing, a control member on said casing, a heat motor unit mounted on said casing for operating said control member, and including an expansible and contractible chamber and a fluid pressure generator communicating with said chamber, said generator having walls formed from material of relatively light weight so as to render the generator highly responsive to heat applied thereto, means for heating said generator, a connecting stem operatively connecting said expansible and contractible chamber to said control member, a filling tube for filling said generator and said chamber with a volatile fluid, said filling tube extending through said connecting stem from one end thereof to said chamber, said filling tube projecting beyond said connecting stem to facilitate the closure of said filling tube after the filling operation, and means for securing said control member in place on said connecting stem, said last mentioned means being operable to enclose and protect said filling tube.

9. A heat-motor operated valve of the character described comprising, in combination, a valve casing having inlet and outlet openings and an interior division wall located between said openings and having a valve port therein, a valve member for closing said port, a heat motor unit mounted on said casing for operating said valve member, and including an expansible and contractible chamber and a fluid pressure generator communicating with said chamber, said generator having walls formed from material of relatively light weight so as to render the generator highly responsive to heat applied thereto, means for heating said generator, a valve stem operatively connecting said expansible and contractible chamber to said valve member, a filling tube for filling said generator and said chamber with a volatile fluid, said filling tube extending through said valve stem to said chamber, said valve member being removably mounted on said valve stem and said filling tube projecting beyond said valve stem to facilitate the closure of said filling tube after the filling operation, a guide stem for securing said valve member in place on said valve stem, said guide stem being operable to enclose and protect said filling tube, and a guide in said valve casing in which said guide stem rides during opening and closing movement of said valve member.

10. In a device of the character described comprising, a valve casing having an inlet and an outlet opening and an interior division wall between said openings with a valve port therein, a valve seat around said valve port, a valve member, a valve stem extending through said valve port for operating said valve member into and out of engagement with said valve seat to open and close the valve port, means for loosely supporting said valve member upon said valve stem whereby any unevenness between the valve seat and valve member is compensated for, said valve member supporting means comprising a first hollow stud secured to the end of the valve stem and having a shoulder portion upon which said valve member loosely rests, a second hollow stud secured to the valve member and enclosing said first hollow stud in a manner to provide a narrow space between both of said studs, means for operating said valve stem including a heat motor operated device containing a volatile liquid, a hollow tube extending through said valve stem to provide a means for filling the heat motor with the volatile liquid, the end of said hollow tube being sealed and projecting beyond the valve stem into said hollow studs whereby the sealed hollow tube is accessible for filling of the volatile liquid when the studs are removed.

11. A heat motor unit comprising, a fluid pressure generator, electric heating means therefor, a pressure responsive expansible and contractible device operatively associated with said generator to expand and contract in response to pressure variations produced in said generator, said device comprising an inner generally cylindrical wall formed at least in part by a flexible member, said device also including an outer generally cylindrical wall surrounding said inner wall and secured in sealed fluid-tight relation at one of its ends to the corresponding end of said inner wall, a cross wall closing the other end of said outer wall, said cross wall being adapted to actuate a movable member, means supporting said expansible and contractible device comprising a hollow stationary stem communicating at one end with said generator and connected to the other end of said inner wall to admit fluid into the space between said outer wall and said inner wall, a guide plate connected to said one end of said outer wall and slidably engaging said stem to guide said one end in a lateral sense relative to said stem as the device expands or contracts, and spring means housed within said inner wall and acting at one end against said guide plate to urge said device toward its expanded position.

12. A pressure operated valve device comprising, a valve casing having inlet and outlet openings and means providing a valve port placing said openings in communication, a pressure responsive expansible and contractible device located in said valve casing, said device comprising an inner generally cylindrical wall formed at least in part by a flexible member and an outer generally cylindrical wall surrounding said inner wall and secured in sealed fluid-tight relation at one of its ends to the corresponding end of said inner wall, a cross wall closing the other end of said outer wall, means including said outer wall and cross wall forming flow controlling means for controlling the flow of fluid through said valve port, means for supporting said expansible and contractible device in said valve casing comprising a hollow stationary stem communicating at one end with a source of controlling pressure and connected to the other end of said inner wall to admit fluid into the space between the outer wall and inner wall, a guide plate connected to said one end of said outer wall and slidably engaging said stem to guide said one end in a lateral sense relative to said stem as the device expands or contracts, and spring means housed within said inner wall and acting at one end against said guide plate to urge said device toward its expanded position.

13. A pressure operated valve device comprising, a valve casing having inlet and outlet openings and means providing a valve port placing said openings in communication, a pressure responsive expansible and contractible device located in said valve casing in alignment with said valve port, said device comprising an inner generally cylindrical wall formed at least in part by a flexible member and an outer generally cylindrical wall surrounding said inner wall and secured in sealed fluid-tight relation at one of its ends to the corresponding end of said inner wall, a cross wall closing the other end of said outer wall, means including said outer wall and cross wall forming flow controlling means for controlling the flow of fluid through said valve port, means for supporting said expansible and contractible device in said valve casing comprising a hollow stationary stem communicating at one end with a source of controlling pressure and connected to the other end of said inner wall to admit fluid into the space between the outer wall and inner wall, guide means connected to said one end of said outer wall and slidably engaging said stem to guide said one end in a lateral sense relative to the said stem as the device expands or contracts, and means for guiding the other end of said outer wall so as to maintain said expansible and contractible device in alignment with said valve port.

14. A pressure operated valve device comprising, a valve casing having inlet and outlet openings and means providing a valve port placing said openings in communication, a pressure responsive expansible and contractible device located in said valve casing, said device comprising an inner generally cylindrical wall formed at least in part by a flexible member and an outer generally cylindrical wall surrounding said inner wall and secured in sealed fluid-tight relation at one of its ends to the corresponding end of said inner wall, a cross wall closing the other end of said outer wall, means including said outer wall and cross wall forming flow controlling means for controlling the flow of fluid through said valve port, supporting means attached to the other end of said inner wall for supporting said expansible and contractible device in said valve casing, fluid passage means for communicating a source of controlling pressure with the space between the outer wall and inner wall, and sealing means between said outer wall and the valve casing for preventing access of the fluid in said valve casing to said inner wall.

15. A pressure operated valve device comprising, a valve casing having inlet and outlet openings and means providing a valve port placing said openings in communication, a pressure responsive expansible and contractible device located in said valve casing in alignment with said valve port, said device comprising an inner generally cylindrical wall formed at least in part by a flexible member and an outer generally cylindrical wall surrounding said inner wall and secured in sealed fluid-tight relation at one of its ends to the corresponding end of said inner wall, a cross wall closing the other end of said outer wall, means including said outer wall and cross wall forming flow controlling means for controlling the flow of fluid through said valve port, supporting means attached to the other end of said inner wall for supporting said expansible and contractible device in said valve casing, fluid passage means for communicating a source of controlling pressure with the space between said outer wall and the valve casing, sealing means for sealing the valve casing and preventing access of fluid in said valve casing to said inner wall, and guide means for maintaining said flow controlling means in alignment with said valve port.

16. A heat motor unit comprising, an elongated cylindrical fluid pressure generator having its axis extending vertically, said generator having a thin side wall of high heat conductive material so as to be highly responsive to heat applied thereto, an electric heater associated solely with the lower portion of the side wall of the generator whereby the thin upper portion is exposed so as to radiate and conduct heat to the surrounding media, a bellows located below the generator, said bellows having a closed end and an open end, the axis of said bellows being in substantial alignment with the axis of said generator and the open end of the bellows facing the generator, a generally cylindrical cup-shaped member surrounding said bellows, means attaching the open end of the cup-shaped member and the open end of the bellows together in a fluid tight manner so as to form a sealed space between the bellows and cup-shaped member, means including hollow connecting means extending from the fluid pressure generator through the open end of the bellows and secured to the closed end thereof, said last recited means maintaining a fixed distance between the generator and the closed end of the bellows and placing the interior of the generator in communication with the sealed space, whereby upon heating of the generator by the electric heater the generator and the end of the sealed space nearer thereto become further separated.

17. In a device of the character described comprising a casing, a control member, a supporting plate arranged in said casing, a boiler supported on top of said supporting plate, a fluid pressure bellows supported below the supporting plate and operatively connected to said control member, means extending through said supporting plate connecting the bellows with the boiler for operating the control member, an electric heater for the boiler, an insulating plate arranged in spaced parallel relation to the supporting plate and arranged to provide lateral support for said boiler, and a terminal plate arranged vertically upon said supporting plate with one end thereof engaging the supporting plate and the other end engaging the insulating plate for supporting the terminal plate, said terminal plate having a plurality of terminals thereon for the connection of wires extending to the electric heater and for external connections.

18. A heat motor unit comprising, a fluid pressure generator, electric heating means therefor, a bellows having a closed end and an open end, the open end of the bellows being adjacent and below said generator, means including hollow connecting means extending downwardly from the fluid pressure generator through the open end of the bellows and secured to the closed end thereof, a generally cylindrical cup-shaped member surrounding said bellows, said cup-shaped member having an open end, means attaching the open end of the cup-shaped member and the open end of the bellows together in a fluid tight manner so as to form a sealed space between said bellows and cup-shaped member, said hollow connecting means maintaining a fixed distance between the generator and the closed end of the bellows and placing the interior of the generator in communication with said sealed space, whereby upon heating of the generator by the electric heater the generator and the end of said sealed space nearer thereto become further separated.

19. A heat motor unit comprising, an elongated cylindrical fluid pressure generator having its axis extending vertically, said generator having a thin side wall of high heat conductive material so as to be highly responsive to heat applied thereto, an electric heater associated with the generator, a bellows located below the generator, said bellows having a closed end and an open end, the axis of said bellows being in substantial alginment with the axis of said generator and the open end of the bellows facing the generator, a generally cylindrical cup-shaped member surrounding said bellows, means attaching the open end of the cup-shaped member and the open end of the bellows together in a fluid tight manner so as to form a sealed space between the bellows and cup-shaped member, means including hollow connecting means extending from the fluid pressure generator through the open end of the bellows and secured to the closed end thereof, said last recited means maintaining a fixed distance between the generator and the closed end of the bellows and placing the interior of the generator in communication with the sealed space, whereby upon heating of the generator by the electric heater the generator and the end of the sealed space nearer thereto become further separated.

HOMER E. MALONE.